US009415503B1

(12) United States Patent
Ferragonio

(10) Patent No.: US 9,415,503 B1
(45) Date of Patent: Aug. 16, 2016

(54) PORTABLE TOOL BOX

(71) Applicant: Joseph R. Ferragonio, Plantation, FL (US)

(72) Inventor: Joseph R. Ferragonio, Plantation, FL (US)

( * ) Notice: Subject to any disclaimer, the term of this patent is extended or adjusted under 35 U.S.C. 154(b) by 0 days.

(21) Appl. No.: 13/928,435

(22) Filed: Jun. 27, 2013

Related U.S. Application Data

(60) Provisional application No. 61/666,151, filed on Jun. 29, 2012.

(51) Int. Cl.
*B62B 3/00* (2006.01)
*B25H 3/02* (2006.01)

(52) U.S. Cl.
CPC .......... *B25H 3/02* (2013.01)

(58) Field of Classification Search
CPC .......... B62B 3/02; B62B 3/025; B62B 3/027; B62B 2203/74; B62B 5/0003
USPC .......... 280/30, 47.34, 47.35, 79.11, 638, 639, 280/640, 651
See application file for complete search history.

(56) References Cited

U.S. PATENT DOCUMENTS

| | | | | | |
|---|---|---|---|---|---|
| 659,508 | A * | 10/1900 | Collins | 108/118 |
| 2,812,188 | A * | 11/1957 | Rusch | 280/641 |
| 3,079,167 | A * | 2/1963 | Russell | 280/641 |
| 3,082,016 | A * | 3/1963 | Pratt | B62B 5/0003 280/641 |
| 3,088,770 | A * | 5/1963 | Ferneau et al. | 296/20 |
| 3,493,262 | A * | 2/1970 | Ferneau | 296/20 |
| 3,498,628 | A * | 3/1970 | Ferneau et al. | 280/641 |
| 4,192,541 | A * | 3/1980 | Ferneau | 296/20 |
| 4,262,606 | A * | 4/1981 | Hodson | 108/99 |
| 4,316,687 | A * | 2/1982 | Lindskog | 410/92 |
| 4,369,985 | A * | 1/1983 | Bourgraf et al. | 280/641 |
| 4,921,295 | A * | 5/1990 | Stollenwerk | A61G 1/0293 296/20 |
| 5,090,335 | A * | 2/1992 | Russell | 108/44 |
| 5,570,988 | A * | 11/1996 | Gallaway et al. | 414/498 |
| 5,642,898 | A | 7/1997 | Wise | |
| 5,775,865 | A * | 7/1998 | Capilupi, Jr. | 414/498 |
| 6,024,527 | A * | 2/2000 | Soriano | 414/345 |
| 6,045,150 | A * | 4/2000 | Al-Toukhi | 280/641 |
| 6,070,899 | A * | 6/2000 | Gines | 280/651 |
| 6,113,088 | A * | 9/2000 | Gakhar et al. | 269/139 |
| 6,152,462 | A * | 11/2000 | Barrett | 280/30 |
| 6,405,393 | B2 * | 6/2002 | Megown | 5/611 |
| 6,431,319 | B1 * | 8/2002 | Myers et al. | 187/243 |
| 6,575,491 | B2 * | 6/2003 | Miller | 280/638 |
| 6,615,973 | B2 | 9/2003 | Fritter | |
| 6,976,696 | B2 * | 12/2005 | O'Krangley et al. | 280/640 |
| 7,229,093 | B1 * | 6/2007 | Carter | 280/651 |
| 7,306,245 | B1 * | 12/2007 | Lowe | 280/47.18 |
| 7,658,388 | B1 * | 2/2010 | Rodriguez et al. | 280/30 |
| 7,815,215 | B1 * | 10/2010 | Lowe | 280/639 |

(Continued)

*Primary Examiner* — Hau Phan
*Assistant Examiner* — Jacob Meyer
(74) *Attorney, Agent, or Firm* — Malin Haley DiMaggio & Bowen, P.A.

(57) ABSTRACT

A portable toolbox having a rigid rectangular tool container with an openable top enclosure, a base and a plurality of independently movable legs attached pivotally to the side of the toolbox having wheels and casters that rotate from a storage position to a mobile position so that the toolbox can be manually moved on its wheels and legs from a truck bed to a jobsite. The legs include pivotal cross braces and support braces which are engaged to the toolbox frame in the mobile position. The legs, the cross braces and support braces can all be simply folded up independently for each leg and each leg rotated to a storage position allowing the toolbox to be securely mounted within a truck bed when not in use.

2 Claims, 8 Drawing Sheets

(56) References Cited

U.S. PATENT DOCUMENTS

| | | | | |
|---|---|---|---|---|
| 8,075,016 | B2 * | 12/2011 | Silberberg | B62B 3/027 280/43 |
| 8,172,256 | B2 * | 5/2012 | Fine | 280/651 |
| 8,408,581 | B1 * | 4/2013 | Hunter | 280/651 |
| 8,505,960 | B1 * | 8/2013 | Shindelar et al. | 280/651 |
| 8,540,273 | B2 * | 9/2013 | Dobrachinski | 280/651 |
| 8,979,115 | B1 * | 3/2015 | Baron | B62B 3/027 280/43 |
| 9,126,610 | B1 * | 9/2015 | Abiri | B62B 5/0003 |
| 9,211,899 | B2 * | 12/2015 | Beauchamp | B62B 5/0003 |
| 9,221,486 | B2 * | 12/2015 | Fine | B62B 5/0003 |
| 2002/0179181 | A1 * | 12/2002 | Murphy | 144/286.5 |
| 2004/0111798 | A1 * | 6/2004 | Matunaga et al. | 5/86.1 |
| 2005/0236788 | A1 * | 10/2005 | Kellogg | 280/79.2 |
| 2006/0006628 | A1 | 1/2006 | Fields | |
| 2008/0061531 | A1 * | 3/2008 | Nugent | B62B 3/027 280/638 |
| 2008/0303248 | A1 * | 12/2008 | Chaparro | B62B 3/027 280/651 |
| 2010/0129185 | A1 * | 5/2010 | Hanson, Jr. | 414/477 |
| 2010/0140887 | A1 * | 6/2010 | Yehiav et al. | 280/33.991 |
| 2011/0156375 | A1 * | 6/2011 | Gal | B62B 3/027 280/651 |
| 2012/0193894 | A1 * | 8/2012 | Fine | B62B 3/027 280/651 |
| 2013/0292925 | A1 * | 11/2013 | Shindelar et al. | 280/651 |

* cited by examiner

PORTABLE TOOL BOX

CROSS REFERENCE TO RELATED APPLICATIONS

This application claims priority to U.S. Provisional Application No. 61/666,151 filed on Jun. 29, 2012.

BACKGROUND OF THE INVENTION

1. Field of the Invention

This invention relates generally to an improved toolbox (preferably carried in a truck bed) and specifically to a portable toolbox that can be easily transferred from a truck bed to the job site manually and easily returned manually to the truck bed.

2. Description of Related Art

Toolboxes are well known in the prior art. Many skilled craftsmen such as carpenters, painters, plumbers, builders and others utilize a permanently mounted toolbox that is typically mounted in the bed of a truck in a permanent manner. This allows the toolbox to be locked and permanently attached in the truck bed to prevent theft. The problem with this permanently mounted toolbox is that it is not movable to the job site which can be hundreds of yards from where the truck is parked requiring the skilled craftsmen to waste time going back and forth to and from the jobsite to retrieve or restore the proper tools to the toolbox. Accordingly, it is desirable for craftsmen to have a portable toolbox that can be mounted safely and securely in a truck bed but at the same time be manually portable and removable from the truck bed to the jobsite during the workday and placeable back in the truck bed at the end of the workday. The invention described herein accomplishes this. It is important that the toolbox support legs do not interfere with each other during the transition from moving the toolbox into or out of a space such as a truck bed. It is also important to realize that most toolboxes that are typically found in a truck bed are much too heavy for one or two people to carry or lift. Therefore the transition of a toolbox resting on a flat surface from a flat surface such as a truck bed to a mobile position where the legs are extended beneath the toolbox must be such that no lifting of the toolbox is necessary to extend the legs. This is accomplished in this invention by having the pivot axis of one pair of legs spaced apart from the end surface of the bottom of the toolbox so that there is a lip area where the toolbox remains supported at one end on a flat surface while the wheels can be moved manually into place and contact the ground, so that the toolbox does not have to be lifted by anyone during the transition.

It is, therefore, to the effective resolution of the aforementioned problems and shortcomings of the prior art that the present invention is directed. Due to the large weight of a typical craftsman tool box, manually carrying the conventional truck bed mounted tool box by one person is not feasible. Moving the tool box out of the truck bed is also problematic due to the tool box weight.

SUMMARY OF THE INVENTION

A portable toolbox comprising a tool storage container having four vertical sidewalls, a bottom wall, and a removable closure to cover the top opening securely of the container. The tool container is substantially rectangular in shape and sized to house a substantial number of tools inside securely and safely which are accessible by having a hinged removable closure on top of the container. The container can be sized in length to fit substantially almost across laterally a truck bed.

The portable toolbox has four independently movable legs attached to side walls of the toolbox. Each of the legs contains a wheel or a castor. Two sets of the legs have cross braces pivotally attached thereto. All four legs have support braces pivotally attached thereto.

The positions of the legs determine the operating condition of the portable toolbox. When the legs are in the vertical down position, or mobile position, the cross braces and the support braces are engaged so that the legs are firmly held in place relative to the toolbox container. This is the operating position of the portable toolbox which allows the toolbox to be moved manually over the ground on its wheels and casters to and from the truck bed to the jobsite.

In the storage position the cross braces and support braces are disengaged at one end and the legs are pivoted to storage positions adjacent the outer sidewalls of the container, out of the way so that the toolbox is securely stored on its bottom frame in a truck bed. The container may also include a plurality of spherical rollers on its underside to facilitation movement of the toolbox in and out of a truck bed when the legs are not deployed.

In some embodiments, provided is a portable toolbox comprising a container, a first set of legs pivotably attached to a first end of said container, and a second set of legs pivotably attached to a second end of the container. The toolbox is operably configurable between a storage position and a mobile position; wherein in the mobile position the first and second sets of legs are deployed downward. Wheels are attached to the ends of each of the legs. The first set of legs is interconnected by a first cross brace when the toolbox is the mobile position. A first support brace is attached between the container and the first set of legs when the toolbox in said mobile position. The second set of legs is interconnected by a second cross brace when the toolbox is in said mobile position. Second support braces are attached between said container and the second set of legs when the toolbox is the mobile position. A plurality of spherical rollers is attached to an underside surface of the container to assist maneuvering of the toolbox when the legs are not deployed.

It is an object of the present invention to provide a portable toolbox that has independently rotatable and storable legs and wheels and that can be easily mounted securely in a truck bed adjacent the truck bed gate.

It is another object of the present invention to provide a toolbox that includes rollers on its bottom to assist maneuvering the toolbox within a truck bed.

It is another object of the present invention to provide a toolbox that is strong, durable, and useful in a variety of situations.

In accordance with these and other objects which will become apparent hereinafter, the instant invention will now be described with particular reference to the accompanying drawings.

PREFERRED EMBODIMENT OF THE INVENTION

Figure 1:
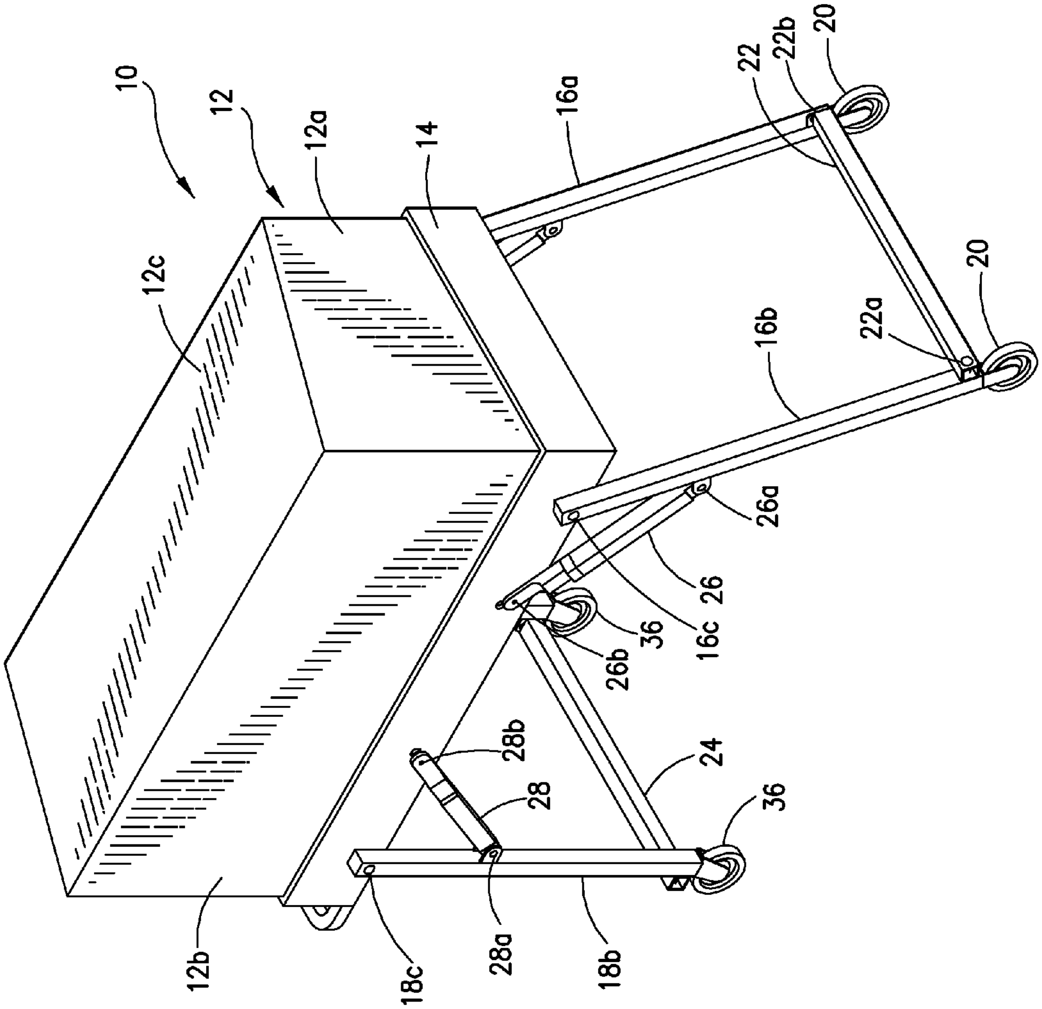
FIG. 1 is a perspective view of the invention.

Referring now to the drawings and in particular FIG. 1, the portable toolbox 10 is shown comprising a substantially rectangular container 12 that is used to house tools as shown in FIG. 1. The size and shape of the container 12 can vary and is not limited to the embodiments shown in the exemplary drawings herein. In some embodiments, the container 12 is disposed on a base 14. Attached to a first end of the toolbox 10 are a first set of bilateral extended legs 16*a* and 16*b*. The first set of legs 16*a* and 16*b* are connected to each other by cross brace 22 and each leg is supported in a rigid position by a support brace 26 which is connected between the respective leg 16*a* and 16*b* and the base 14. At the second end of the toolbox 10 are a second set of bilateral rotatable legs 18*a* and 18*b* which, in an extended position, are disposed vertically and essentially perpendicular to the bottom of the toolbox 10. The second set of legs 18*a* and 18*b* are connected to each other by cross brace 24 and each leg is supported in a rigid position by a support brace 28 which is connected between the respective leg 18*a* and 18*b* and the base 14. In some embodiments, the first set of legs 16*a* and 16*b* have a pair of wheels 20 rotatably attached at the end of each leg. In some embodiments, the second set of legs 18*a* and 18*b* include casters 36 at each end thereof. The legs sets herein, in some embodiments, are each telescopically adjustable in length to the allow use of the portable tool box with truck beds of different heights.

Leg 16*b* pivots around pin 16*c* and leg 18*b* pivots around pin 18*c*, pins are also provided on the other side of the toolbox 10 for legs 16*a* and 18*a*. Cross brace 22 pivots around pin 22*a* and is removably fastened by fastener 22*b* to leg 16*a*. Support brace 26 pivots around pin 26*a* and is engaged at one end to the frame 14 by fastener 26*b*. Support brace 28 pivots around pin 28*a* and is removably secured to frame 14 by fastener 28*b*.

Figure 2:
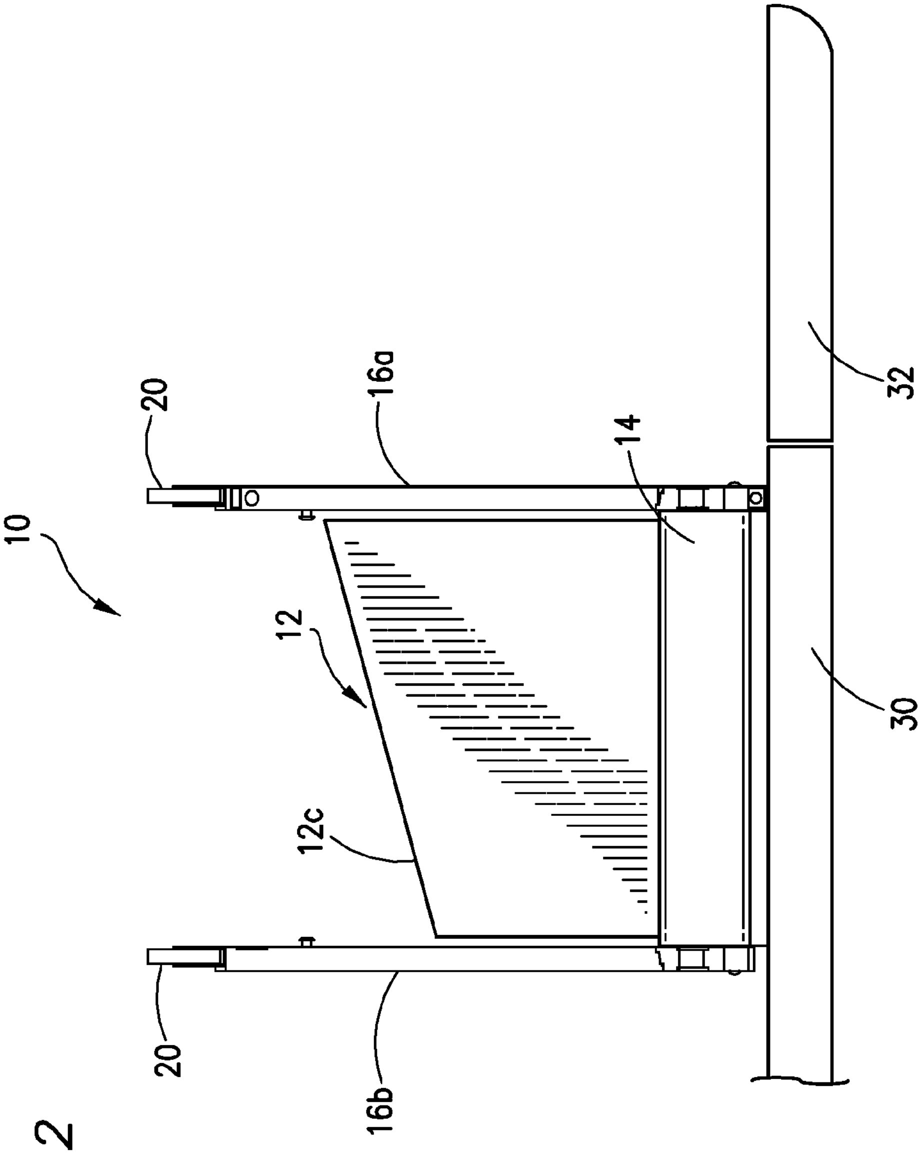
FIG. 2 is a side elevational view of the invention mounted in a truck bed partially cutaway.

FIG. 2 shows the toolbox 10 disposed transversely across an exemplary truck bed 30 adjacent the truck bed tailgate 32 which represents the storage position of the present invention. Here, the first set of legs 16*a* and 16*b* are shown in a retracted position. In some embodiments, top surface 12*c* of the tool box is sloped from the back side 12*b* of the tool box to the front side to allow storage of other objects in the truck bed. In this storage position, supplies, materials and equipment such as boards can be placed on the tailgate 32 without interfering with the tool box 10.

Figure 3:
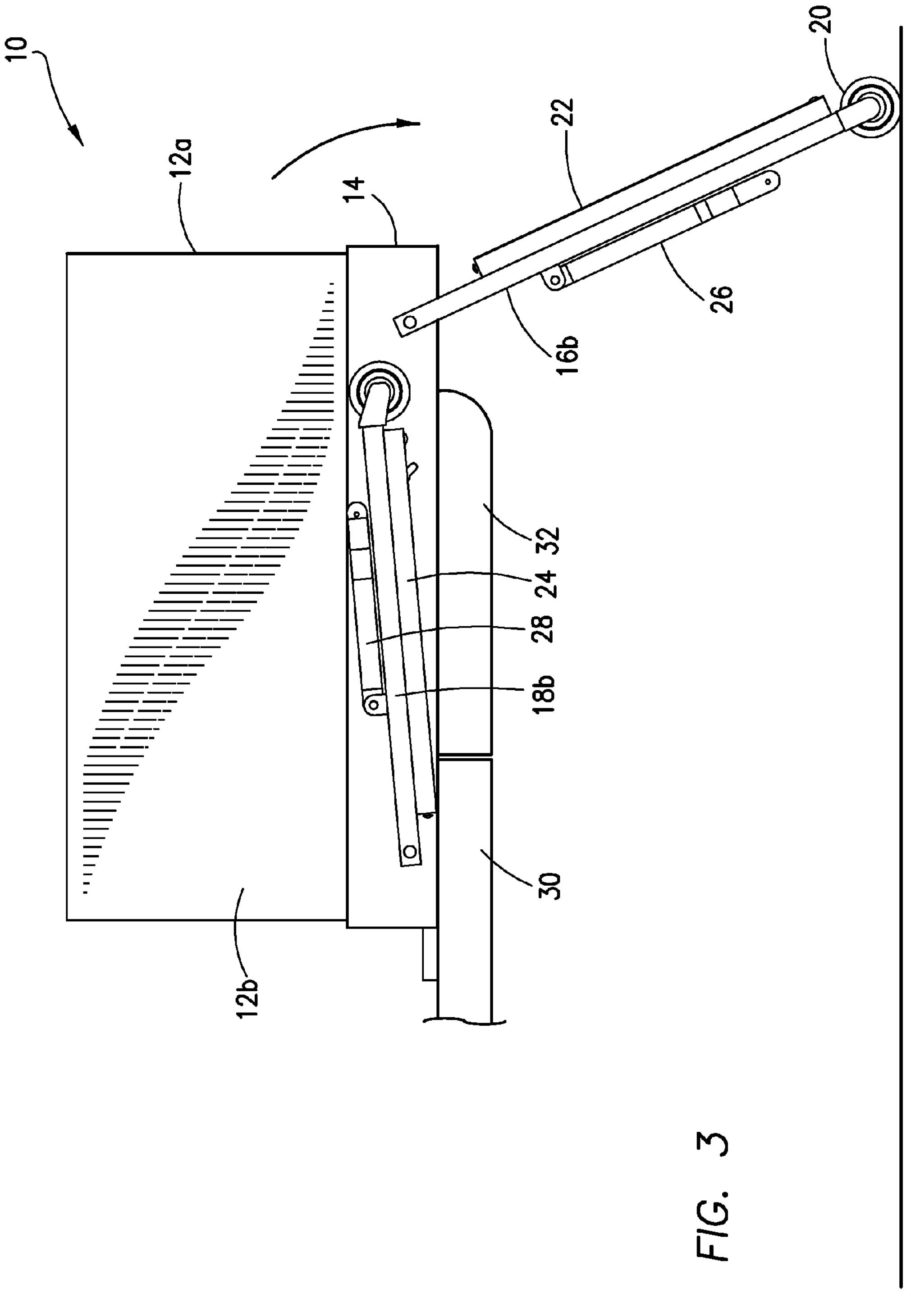
FIG. 3 side elevational view showing the portable toolbox with one set of wheels engaging the ground during set up between the stored position and the mobile position.

Referring now to FIG. 3 the portable toolbox 10 is shown in transition wherein the toolbox 10 has been turned from its storage position about truck bed 30. The toolbox 20 is pulled toward the edge of the tailgate 32 and the first set of legs 16*a* and 16*b* are rotated downward. Shown here, leg 16*b* has been rotated down to the mobile position such that wheel 20 contacts the ground below the truck bed 30. As shown in FIG. 3, the support brace has not yet been connected to base 14. Leg 18*b* is still shown in the storage position and its complementary leg 18*a* (not shown) is also in the storage position. Cross braces 22 and 24 and support braces 26 and 28 are in the storage position.

Figure 4:
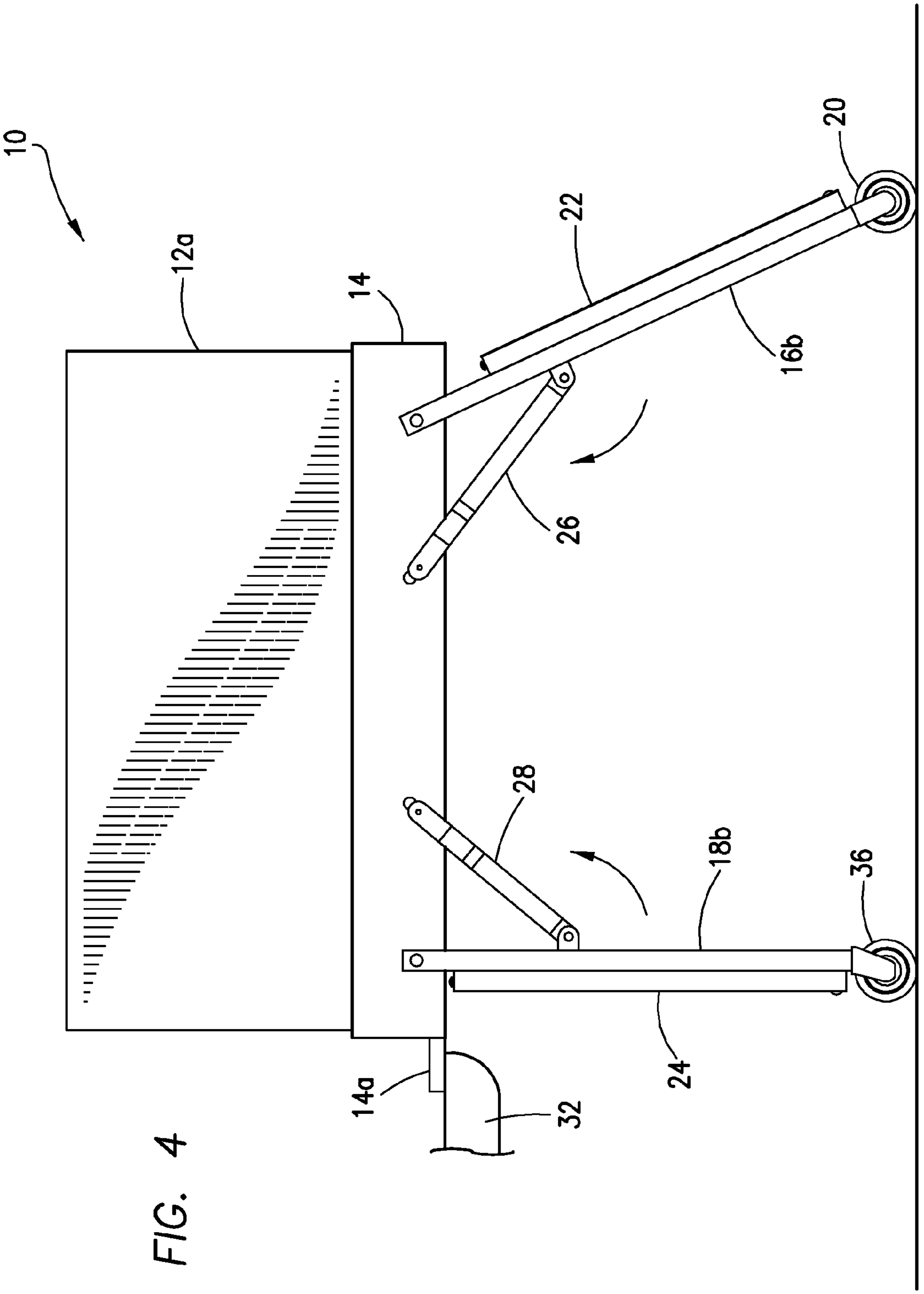
FIG. 4 is a side elevational view of the portable toolbox in the mobile position.

Referring now to FIG. 4, the toolbox 10 is shown with the first set of legs 16*a* and 16*b* and the second set of legs 18*a* and 18*b* all in the extended position. Here, the sets of legs are supported by support brace 26 and support brace 28, respectively, so that the legs are firmly attached to the base 14 of the toolbox 10. In some embodiments, a support lip 14*a* extends from the rear of the base 14 to help support the end of the toolbox 10 on the truck bed tail gate while the legs are being deployed. The support lip 14*a* allows the toolbox to rest at the end of the tailgate in order for the user to deploy the second set legs 18*a* and 18*b* without the toolbox 10 falling off of the tailgate 23. As shown in FIG. 4 the cross braces 22 and 24 have not yet been deployed.

Figure 5:
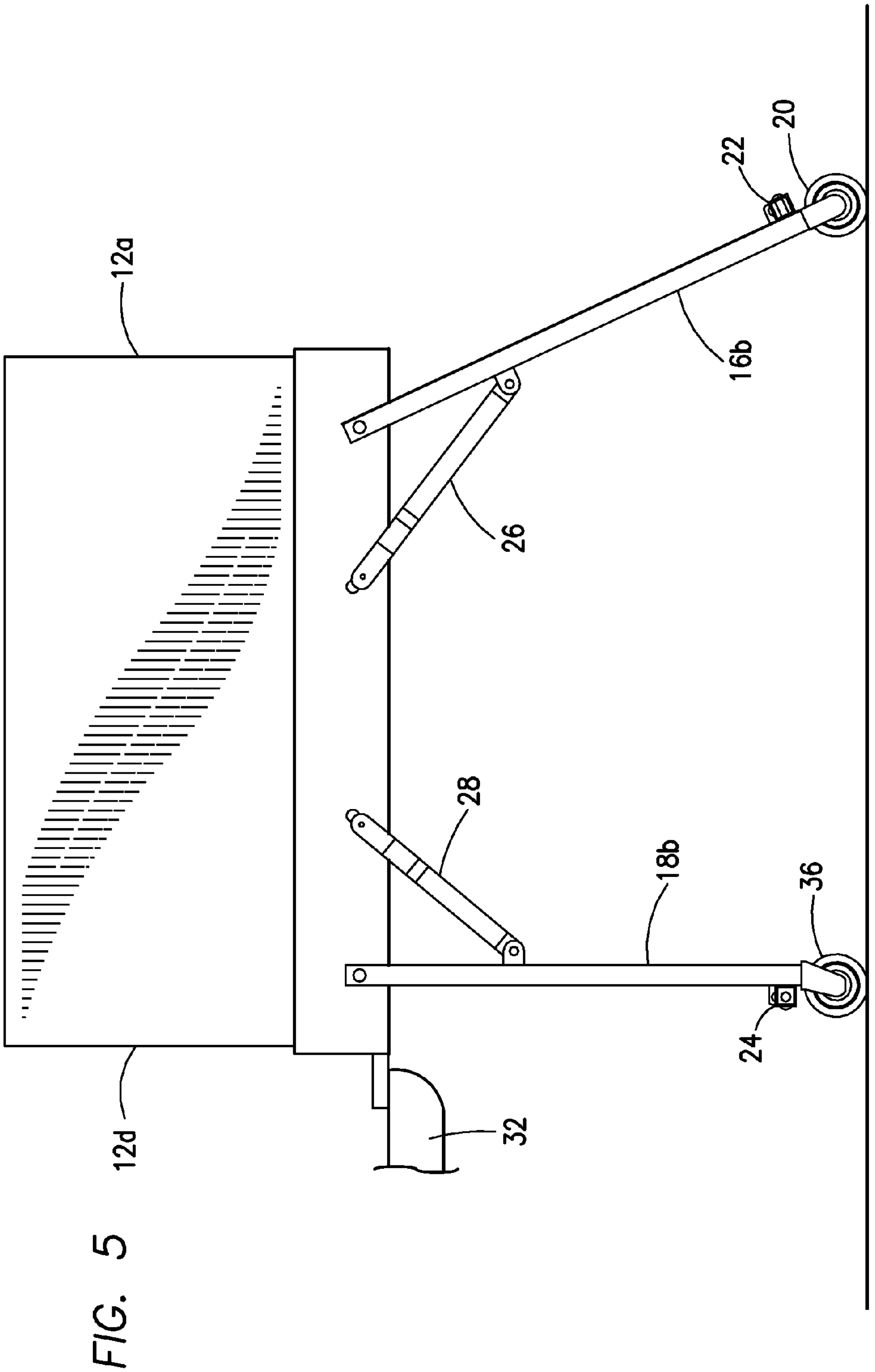
FIG. 5 is a side elevational view of the portable toolbox in the mobile position with the cross braces engaged.

Referring now to FIG. 5, the toolbox 10 is fully deployed in the mobile mode of operation and is ready to be moved around and transported, such as to a jobsite. Here, the cross braces 22 and 24 have been deployed such that each set of legs of the toolbox 10 are firmly interconnected. Here, the wheels 20 and casters 36 are firmly on the ground, allowing the toolbox 10 to be easily transported and maneuvered as desired.

Figure 6:
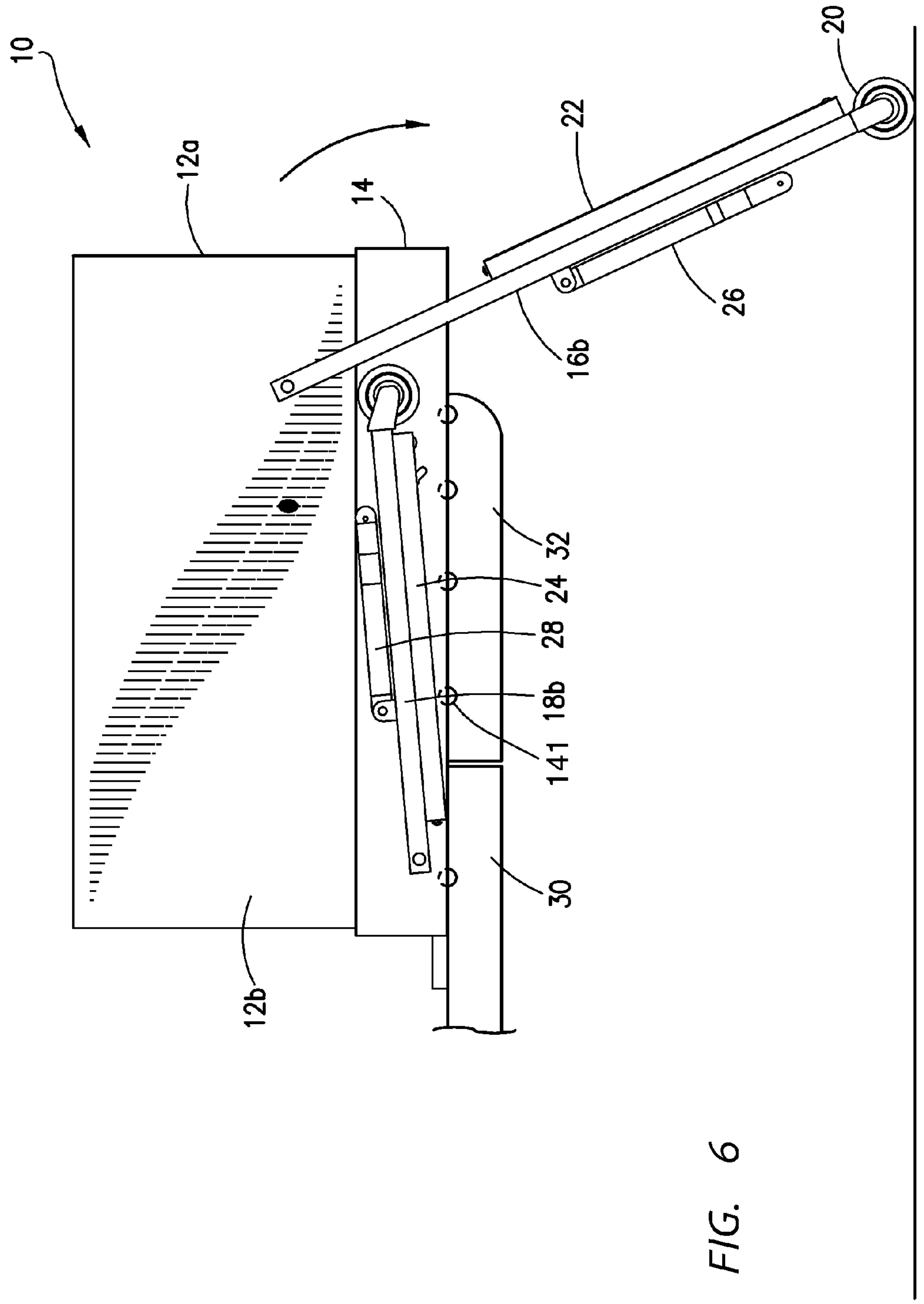
FIG. 6 side elevational view of another embodiment of the present invention showing the portable toolbox with one set of wheels engaging the ground during set up between the stored position and the mobile position.
Figure 7:
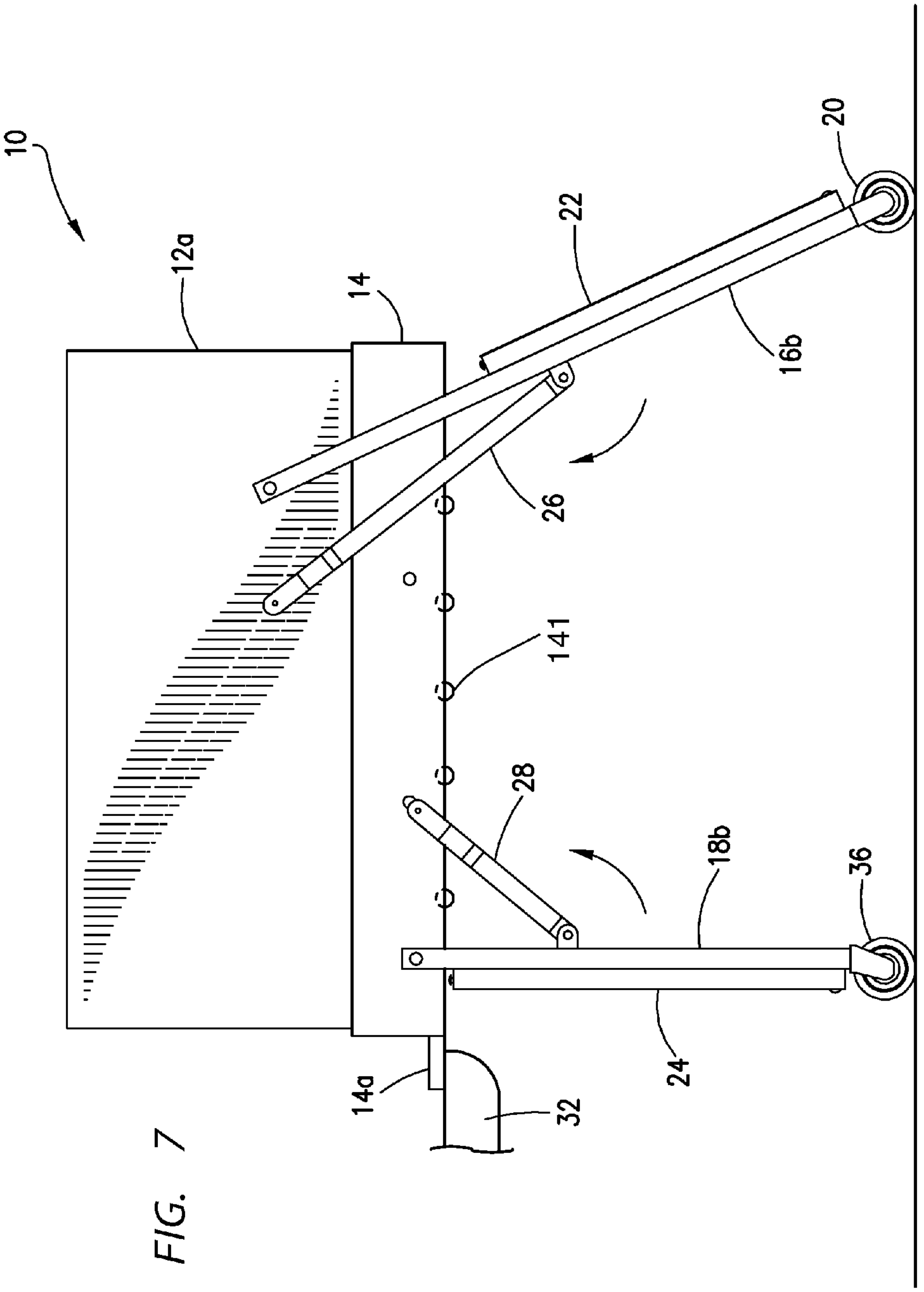
FIG. 7 is a side elevational view another embodiment of the portable toolbox in the mobile position.
Figure 8:
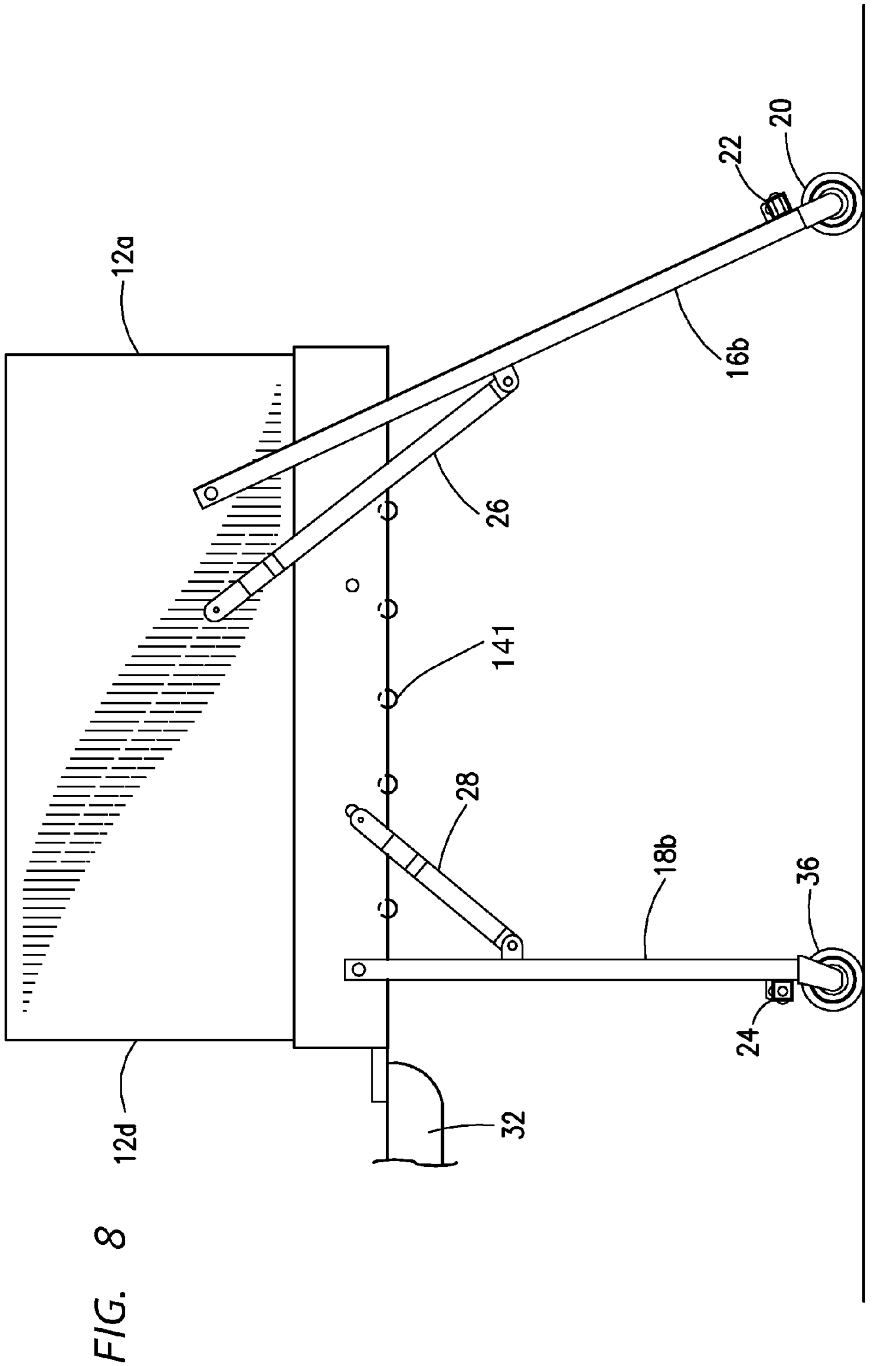
FIG. 8 is a side elevational view of another embodiment of the portable toolbox in the mobile position with the cross braces engaged.

FIGS. 6-8 depict an alternate embodiment of the present invention, wherein the first set of legs 16*a* and 16*b* are extended such that they are pivotably attached to the container 12, rather than the base 14. Support braces 26 are likewise extended upward and attached to the container 12. This provides additional clearance for the legs 16*a* and 16*b* and avoid potential interference with the second set of legs 18*a* and 18*b* in both the storage position and the extended mobile position. Additionally, as shown in FIGS. 6-8, some embodiments of the toolbox 10 may include a plurality of spherical rollers 141 attached to the underside of toolbox 10, at base 14. The rollers assist the user in moving the toolbox 10 in and out of the truck bed 30 and also ease maneuvering of same from a transverse position across the bed 30 to a lengthwise position along the bed 30. The rollers 141 can be disposed along either side of the base 14 to provide additional upward support for the toolbox 10 when the legs are not deployed. The rollers are located on the toolbox 10 such that they will not interfere with the action of the legs.

The portable toolbox shown because the legs independently rotate between a storage position and a mobile position allows a significantly sized toolbox to be moved quickly and easily manually from a truck bed where the toolbox has been secured safely to a jobsite. When the toolbox is in the storage position, the legs, support braces, and cross braces can all be conveniently folded up parallel to the legs and the legs rotated to a storage position so that the toolbox can be safely stored in a truck bed. Additional securing devices such as locks security bars can be installed in the truck bed so that the portable toolbox is safely secured to the truck bed when not in use.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A portable toolbox sized in length for storage in a truck bed comprising:

a rigid substantially rectangular container having a rectangular base, said base having a bottom surface; said container having front and back rectangular, parallel, vertical walls attached to said base; said container base having parallel vertical front and back walls; said container having first and second parallel vertical sidewalls;

said container base having first and second parallel vertical sidewalls attached to said container base front and back vertical walls; said container base first vertical sidewall defining a first end of said container base and said second vertical sidewall defining a second end of said container base;

a first leg attaching pin and a second leg attaching pin;

a first leg for supporting said container, said first leg having a distal end and a proximal end; said first leg proximal end pivotally attached to said container base back wall by said first leg attaching pin near said container first end; said first leg having a wheel rotatably connected to its distal end;

a second leg for supporting said container, said second leg having a distal end and a proximal end; said second leg proximal end pivotally attached to said container base front wall near said container first end by said second leg attaching pin; said second leg having a wheel rotatably attached to said second leg proximal end;

said first leg and said second leg being movable in unison from a vertical storage position, said first leg wheel and said second leg wheel being above said container, 180° to a vertical mobile support position;

a third leg attaching pin and a fourth leg attaching pin;

a third leg having a proximal end and a distal end; said third leg proximal end pivotally attached to said container base back wall by said third leg attaching pin near said container second end; said third leg having a wheel rotatably attached to said third leg proximal end;

a fourth leg having a proximal end and a distal end; said fourth leg proximal end pivotally attached to said container base front wall by said fourth leg attaching pin near said container second end; said fourth leg having a wheel attached to said fourth leg distal end;

said third leg and said fourth leg movable in unison from a horizontal storage position 90° to a mobile vertical container support position; and a plurality of rollers mounted on the container base bottom surface permitting the container base to freely roll on a flat surface;

whereby removing the toolbox from a flat surface such as a truck bed does not require lifting the toolbox.

2. A movable toolbox as in claim 1, including:

said first leg and said third leg rotate in the same plane; and said second leg and said fourth leg rotate in the same plane.

* * * * *